A. J. HAYDEN.
SELF CLEANING RAKE.
APPLICATION FILED NOV. 10, 1913.
1,095,966.
Patented May 5, 1914.
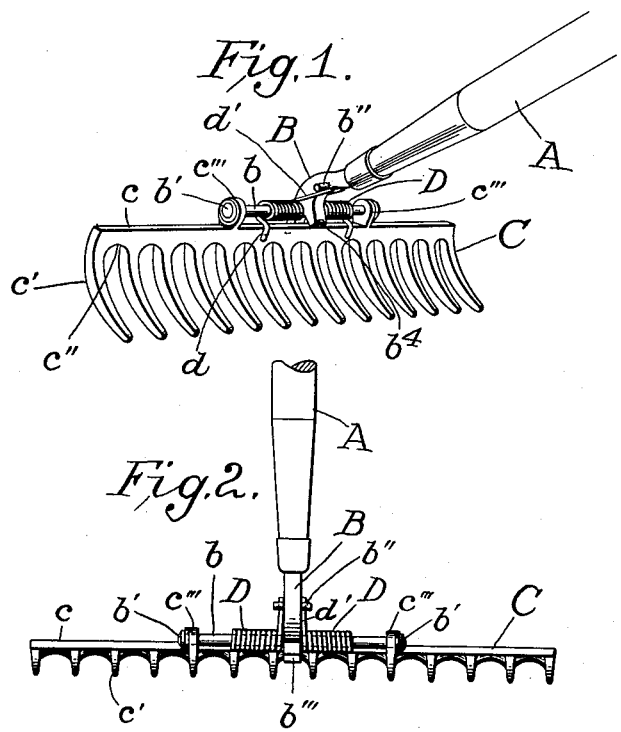
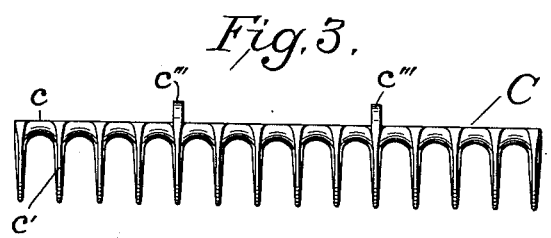
Attest
Ewd R. Tolson,
H. L. Alden
Inventor:
Alfred John Hayden,
by John Middleton Donaldson Shean
Attys.

UNITED STATES PATENT OFFICE.

ALFRED JOHN HAYDEN, OF TOPEKA, KANSAS.

SELF-CLEANING RAKE.

1,095,966.  Specification of Letters Patent.  Patented May 5, 1914.

Application filed November 10, 1913. Serial No. 800,207.

*To all whom it may concern:*

Be it known that I, ALFRED JOHN HAYDEN, a citizen of the United States, residing at Topeka, Kansas, have invented certain new and useful Improvements in Self-Cleaning Rakes, of which the following is a specification.

My present invention relates to improvements in rakes, such as ordinarily used for cleaning up yards, lawns, gardens and for pulverizing the earth in making garden-beds etc., and the object of the invention is to provide a rake of simple, durable and efficient construction from which the material which ordinarily adheres to or between the teeth of the rake may be freed or removed without the necessity of using the hands; as is customary with the rakes in common use, and also which will readily cut clods in its backward movement when pulverizing the earth in making garden-beds. With these and other objects in view the invention includes the novel features of construction and arrangement and combination of parts hereinafter described and defined by the appended claims.

The invention is illustrated in the accompanying drawings, in which,—

Figure 1 is a perspective view. Fig. 2 is a plan view. Figs. 3, 4 and 5 are detail views of separated parts.

Referring by reference characters to this drawing, the letter (A) designates the handle which is provided with a suitable single shank (B).

(C) designates the toothed portion of the rake which consists of a cross-bar ($c$) which carries a plurality of teeth of the ordinary curved shape, the rear edges of which are narrower than at front portion as is shown at ($c'$). The cross-bar is arch shaped between each tooth as is shown at ($c''$), and the teeth wedge shape in cross section. The cross-bar has lugs ($c'''$) into which are connected the pin portions ($b$) of the single shank (B) and are fastened thereto by means of heading over or up setting the ends of the pin portions as is shown at ($b'$). The pin portions, one of which projects out from each side of the single shank, are encircled by two springs (D), preferably in the form of helical springs, the ends ($d$) of which bear against the inner face of the toothed cross-bar $c$ of the rake, while the central ends ($d'$) bear against the pins or stops ($b''$), one of which also projects out at each side of the single shank. This tends to hold the teeth normally in the position shown in Fig. 1, a stop ($b'''$) being provided for limiting the outward movement.

When the teeth of the rake have become clogged they may be readily cleared by simply pressing the rake downward upon the ground which will swing the teeth up into a position parallel with the ground and then a slight backward movement along the ground will carry the rubbish out from the teeth of the rake. As soon as the teeth are clear and pressure upon the rake released, the teeth will spring out into normal position ready for use.

When raking earth in garden work, the curved teeth which are narrower or wedge shape on the rear edge will readily cut through clods as the rake is moved backward, thereby pulverizing the earth quickly.

A second stop $b^4$ limits the forward movement of the rake on its pivot.

Having thus described my invention, what I claim is:—

1. A rake for garden and like purposes comprising a shank having laterally extending pins, a toothed member having lugs pivotally connected with the extremities of said pins, springs encircling each of said pins and exerting tension on said lugs, and a stop integral with said shank for limiting the movement of the toothed member to hold the said member normally at substantially right angles to the handle.

2. A rake for garden and like purposes comprising a handle having a suitable single shank with pin portions projecting out from each side of said shank, a toothed carrying cross-bar having lugs on its top portion pivotally connected to said pin portions at each side of said shank, and two springs of helical shape encircling each of the said pin portions, and having portions bearing respectively against the cross-bar and small pin portions on the shank, substantially as described.

3. A rake for garden and like purposes comprising a handle having a single suitable shank, pin portions projecting laterally thereof, a toothed carrying cross-bar having upwardly extending lugs provided with openings receiving the extremities of said projecting arms, a pair of helical springs encircling said projecting arms and having ends bearing against the cross-bar and other ends extending upward along side said shank portion, said shank portion having projections against which said last named ends of the springs bear, said shank portion having downwardly extending lugs in front and back of said cross-bar for limiting the forward and backward movement thereof, substantially as described.

In testimony whereof, I affix my signature in presence of two witnesses.

ALFRED JOHN HAYDEN.

Witnesses:
E. R. CORBIN,
L. H. SCHENCK.